US011765457B2

(12) United States Patent
Ding et al.

(10) Patent No.: US 11,765,457 B2
(45) Date of Patent: Sep. 19, 2023

(54) DYNAMIC ADJUSTMENT OF EXPOSURE AND ISO TO LIMIT MOTION BLUR

(71) Applicant: Snap Inc., Santa Monica, CA (US)

(72) Inventors: Bo Ding, Boulder, CO (US); Ozi Egri, Yassur (IL); Matthias Kalkgruber, Vienna (AT); Daniel Wolf, Mödling (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/522,642

(22) Filed: Nov. 9, 2021

(65) Prior Publication Data

US 2022/0377239 A1 Nov. 24, 2022

Related U.S. Application Data

(60) Provisional application No. 63/190,106, filed on May 18, 2021.

(51) Int. Cl.
H04N 23/68 (2023.01)
G06T 19/00 (2011.01)

(52) U.S. Cl.
CPC ....... H04N 23/6811 (2023.01); H04N 23/684 (2023.01); H04N 23/6812 (2023.01); G06T 19/006 (2013.01)

(58) Field of Classification Search
CPC .......... H04N 5/23254; H04N 5/23258; H04N 5/2327; G06T 19/006
See application file for complete search history.

(56) References Cited

U.S. PATENT DOCUMENTS

| 2010/0119171 | A1 | 5/2010 | Gobert |
| 2011/0193990 | A1 | 8/2011 | Pillman et al. |
| 2012/0314093 | A1 | 12/2012 | Tamayama et al. |
| 2014/0037137 | A1 | 2/2014 | Broaddus et al. |
| 2014/0363096 | A1 | 12/2014 | Zhou et al. |
| 2015/0187133 | A1 | 7/2015 | Martini |
| 2016/0173749 | A1 | 6/2016 | Dallas et al. |

(Continued)

FOREIGN PATENT DOCUMENTS

| WO | WO-2022245648 A1 | 11/2022 |
| WO | WO-2022245821 A1 | 11/2022 |
| WO | WO-2022246383 A1 | 11/2022 |

OTHER PUBLICATIONS

"International Application Serial No. PCT US2022 029182, International Search Report dated Aug. 30, 2022", 5 pgs.

(Continued)

Primary Examiner — Twyler L Haskins
Assistant Examiner — Fayez A Bhuiyan
(74) Attorney, Agent, or Firm — SCHWEGMAN LUNDBERG & WOESSNER, P.A.

(57) ABSTRACT

A method for limiting motion blur in a visual tracking system is described. In one aspect, the method includes accessing a first image generated by an optical sensor of the visual tracking system, identifying camera operating parameters of the optical sensor for the first image, determining a motion of the optical sensor for the first image, determining a motion blur level of the first image based on the camera operating parameters of the optical sensor and the motion of the optical sensor, and adjusting the camera operating parameters of the optical sensor based on the motion blur level.

20 Claims, 10 Drawing Sheets

(56) References Cited

U.S. PATENT DOCUMENTS

| | | |
|---|---|---|
| 2019/0122378 A1 | 4/2019 | Aswin |
| 2020/0374455 A1* | 11/2020 | Ilic .................. H04N 5/232933 |
| 2020/0389583 A1 | 12/2020 | Levy et al. |
| 2021/0026366 A1 | 1/2021 | Horesh |
| 2021/0114748 A1 | 4/2021 | Takahashi et al. |
| 2022/0375041 A1 | 11/2022 | Borys et al. |
| 2022/0377238 A1 | 11/2022 | Kalkgruber et al. |

OTHER PUBLICATIONS

"International Application Serial No. PCT US2022 029182, Written Opinion dated Aug. 30, 2022", 5 pgs.

"International Application Serial No. PCT US2022 029629, International Search Report dated Sep. 1, 2022", 4 pgs.

"International Application Serial No. PCT US2022 029629, Written Opinion dated Sep. 1, 2022", 7 pgs.

Jurik, Martin, "Trade-off Between Resolution and Frame Rate for Visual Tracking of Mini-robots on Planar Surfaces", International Conference on Manipulation, Automation and Robotics at Small Scales (MARSS), IEEE, (Jul. 1, 2019), 1-6.

"U.S. Appl. No. 17/521,109, Non Final Office Action dated Dec. 1, 2022", 12 pgs.

"International Application Serial No. PCT/US2022/072340, International Search Report dated Sep. 30, 2022", 5 pgs.

"International Application Serial No. PCT/US2022/072340, Written Opinion dated Sep. 30, 2022", 12 pgs.

Bretzner, L., et al., "Feature Tracking with Automatic Selection of Spatial Scales", Computer Vision and Image Understanding, Academic Press, US, vol. 71, No. 3, (Sep. 1, 1998), 385-392.

U.S. Appl. No. 17/521,081, filed Nov. 8, 2021, Selective Image Pyramid Computation for Motion Blur Mitigation in Visual-Inertial Tracking.

U.S. Appl. No. 17/521,109, filed Nov. 8, 2021, Direct Scale Level Selection for Multilevel Feature Tracking Under Motion Blur.

"U.S. Appl. No. 17/521,109, Response filed Jan. 16, 2023 to Non Final Office Action dated Dec. 1, 2022", 12 pgs.

"U.S. Appl. No. 17/521,109, Notice of Allowance dated Feb. 8, 2023", 9 pgs.

\* cited by examiner

DYNAMIC ADJUSTMENT OF EXPOSURE AND ISO TO LIMIT MOTION BLUR

RELATED APPLICATION

The present application claims priority to U.S. Provisional Patent Application Ser. No. 63/190,101, filed May 18, 2021, which is hereby incorporated by reference in its entirety.

TECHNICAL FIELD

The subject matter disclosed herein generally relates to a visual tracking system. Specifically, the present disclosure addresses systems and methods for limiting motion blur in the visual tracking system.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system (also referred to as visual tracking system) uses images captured by an optical sensor of the AR/VR device to track its pose. However, the images can be blurry when the AVM device moves fast. As such, high motion blur results in degraded tracking performance. Alternatively, high motion blur results in higher computational operations to maintain adequate tracking accuracy and image quality under high dynamics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
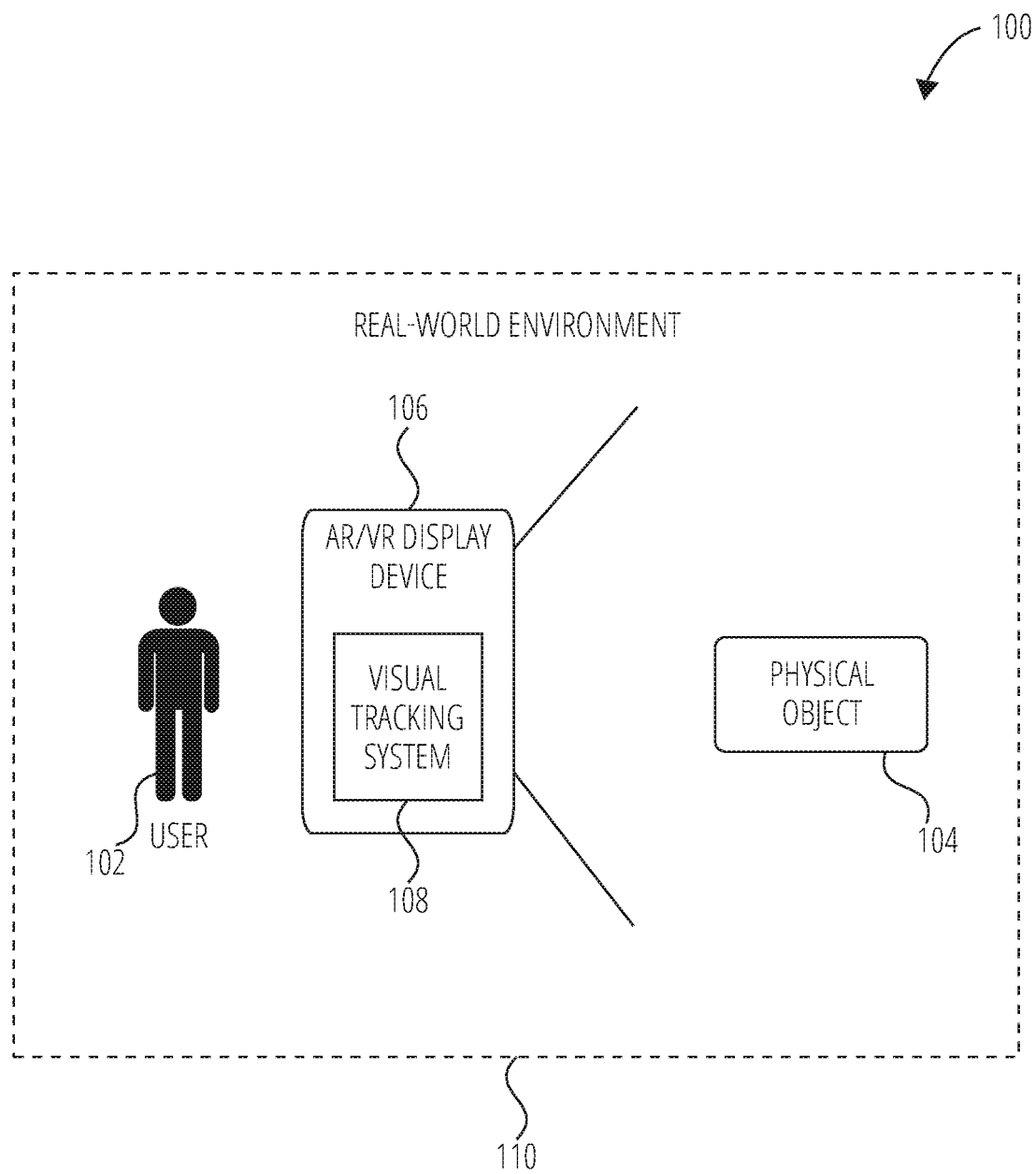
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

Both AR and VR applications allow a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). To do this, the AR display device detects the physical object and tracks a pose of the AR display device relative to a position of the physical object. A pose identifies a position and orientation of the display device relative to a frame of reference or relative to another object. For VR, the virtual object appears at a location based on the pose of the VR display device. The virtual content is therefore refreshed based on the latest pose of the device. A visual tracking system at the display device determines the pose of the display device. An example of a visual tracking system includes a visual-inertial tracking system (also referred to as visual odometry system) that relies on data acquired from multiple sensors (e.g., optical sensors, inertial sensors).

Images captured by the visual tracking system can be blurry when the camera moves fast (e.g., rotates fast). The motion blur in the images can result in degraded tracking performance (of the visual tracking system). Alternatively, motion blur can also result in higher computational operations of the visual tracking system in order to maintain adequate tracking accuracy and image quality under high dynamics. In particular, cameras with fixed value for either exposure time and/or ISO do not limit or reduce motion blur.

The present application describes a method for limiting image blur when the visual tracking system of a display device turns or moves fast. Limiting image blur enables better tracking results. In one example, a blur reduction module of the visual tracking system dynamically adjusts exposure time and ISO of one or more cameras of the visual tracking system based on a current rate of motion of the camera/visual tracking system. This dynamic setting results in minimizing blur during tracking while still maintaining high image quality during image capture. In one example embodiment, a blur reduction module samples angular/linear acceleration in real-time and adjusts exposure and ISO of the camera to achieve permissible motion blur, while keeping overall brightness constant. For example, the blur reduction module increases exposure time and decreases ISO for stationary cases, and decreases exposure and increases ISO for dynamic cases.

The blur reduction module estimates a motion blur level based on an angular/linear velocity of the camera. In one example, the angular velocity is determined based on inertial sensor data from an IMU of the visual tracking system or the display device. In another example, the angular/linear velocity is determined based on tracking 3D points with a VIO of the visual tracking system.

In one example embodiment, a method for limiting motion blur in the visual tracking system includes accessing a first image generated by an optical sensor of the visual tracking system, identifying camera operating parameters of the optical sensor for the first image, determining a motion of the optical sensor for the first image, determining a motion blur level of the first image based on the camera operating parameters of the optical sensor and the motion of the optical sensor, and adjusting the camera operating parameters of the optical sensor based on the motion blur level.

As a result, one or more of the methodologies described herein facilitate solving the technical problem of limiting motion blur in images that are used for tracking of a device. The presently described a method provides an improvement to an operation of the functioning of a computer by limiting motion blur with minimal power consumption. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a visual tracking system 108. The visual tracking system 108 tracks the pose (e.g., position and orientation) of the AR/VR display device 106 relative to the real-world environment 110 using, for example, optical sensors (e.g., depth-enabled 3D camera, image camera), inertial sensors (e.g., gyroscope, accelerometer), wireless sensors (Bluetooth, Wi-Fi), GPS sensor, and audio sensor. In one example, the AR/VR display device 106 displays virtual content based on the pose of the AR/VR display device 106 relative to the real-world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6 to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
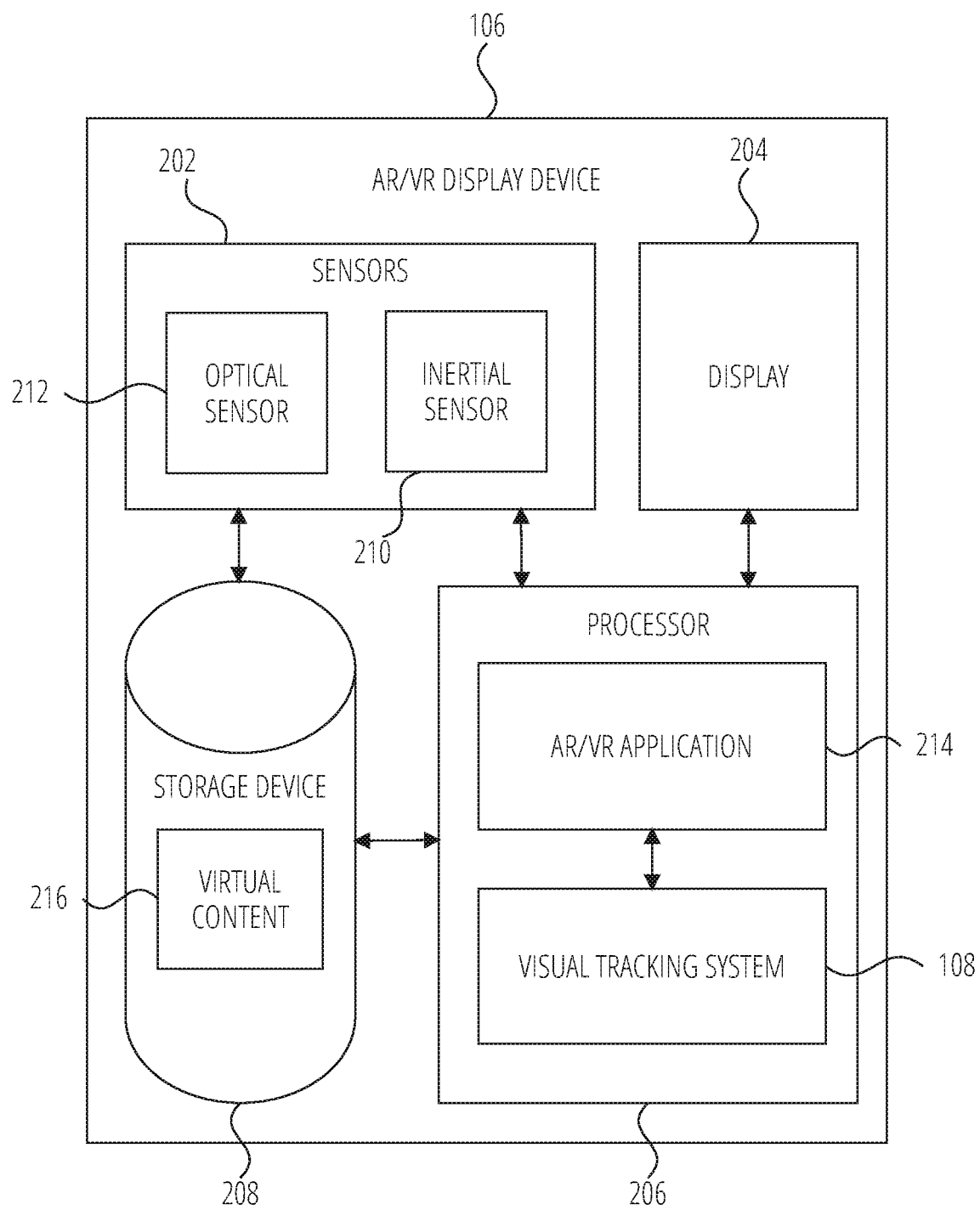
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 206, and a storage device 208. Examples of AR/VR display device 106 include a wearable computing device, a mobile computing device, a navigational device, a portable media device, or a smart phone.

The sensors 202 include, for example, an optical sensor 212 (e.g., camera such as a color camera, a thermal camera, a depth sensor and one or multiple grayscale, global/rolling shutter tracking cameras) and an inertial sensor 210 (e.g., gyroscope, accelerometer, magnetometer). Other examples of sensors 202 include a proximity or location sensor (e.g., near field communication, GPS, Bluetooth, Wifi), an audio sensor (e.g., a microphone), a thermal sensor, a pressure sensor (e.g., barometer), or any suitable combination thereof. It is noted that the sensors 202 described herein are for illustration purposes and the sensors 202 are thus not limited to the ones described above.

The display 204 includes a screen or monitor configured to display images generated by the processor 206. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 206 includes an AR/VR application 214 and a visual tracking system 108. The AR/VR application 214 detects and identifies a physical environment or the physical object 104 using computer vision. The AR/VR application 214 retrieves virtual content (e.g., 3D object model) based on the identified physical object 104 or physical environment. The AR/VR application 214 renders the virtual object in the display 204. In one example embodiment, the AR/VR application 214 includes a local rendering engine that generates a visualization of virtual content overlaid (e.g., superimposed upon, or otherwise displayed in tandem with) on an image of the physical object 104 captured by the pose estimation module 308. A visualization of the virtual content may be manipulated by adjusting a position of the physical object 104 (e.g., its physical location, orientation, or both) relative to the pose estimation module 308. Similarly, the visualization of the virtual content may be manipulated by adjusting a pose of the AR/VR display device 106 relative to the physical object 104. For a VR application, the AR/VR application 214 displays the virtual content in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensor 212 and the inertial sensor 210 to track a location and pose of the AR/VR display device 106 relative to a frame of reference (e.g., real-world environment 110). The visual tracking system 108 is described in more detail below with respect to FIG. 3.

The storage device 208 stores virtual content 216. The virtual content 216 includes, for example, a database of visual references (e.g., images of physical objects) and corresponding experiences (e.g., three-dimensional virtual object models).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
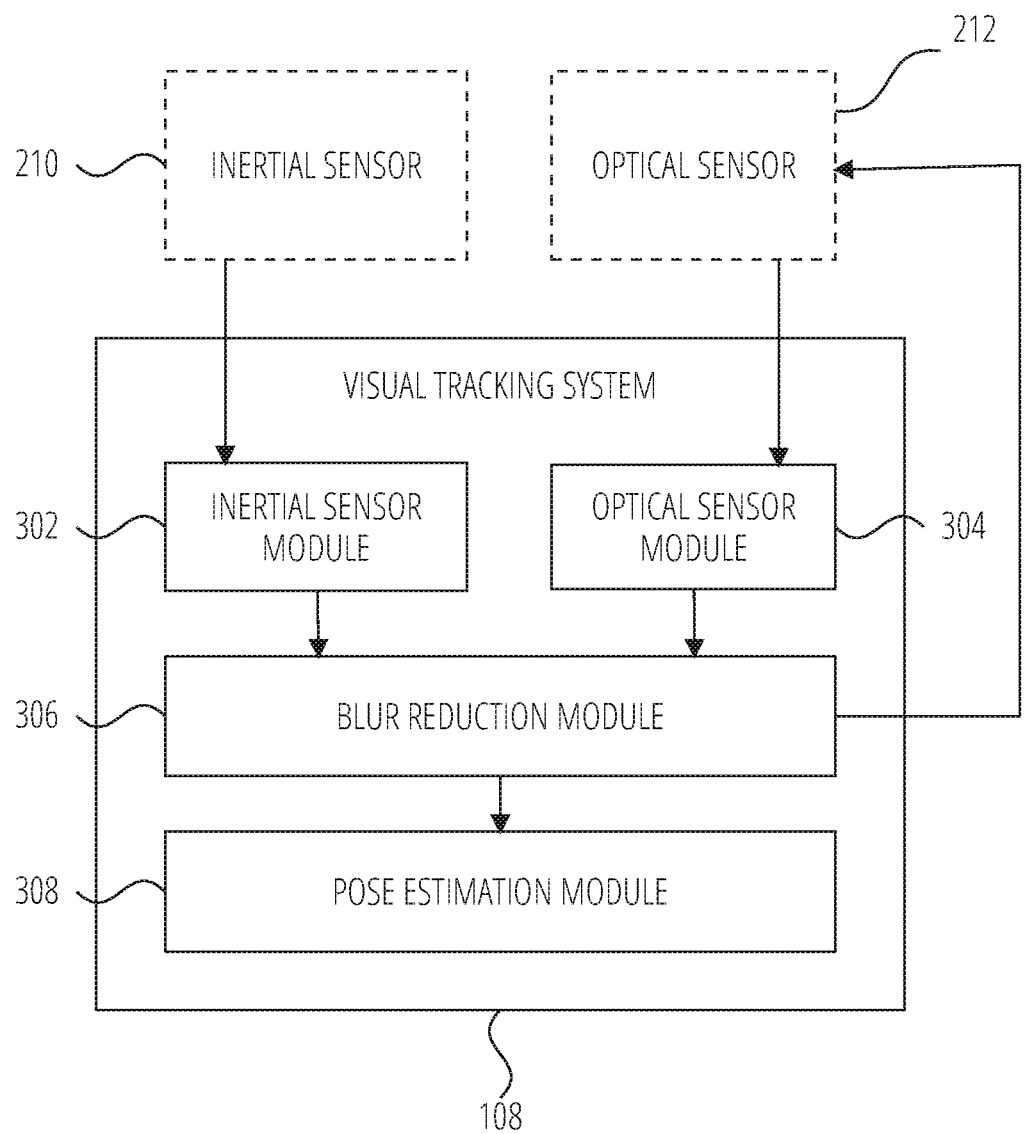
FIG. 3 is a block diagram illustrating a visual tracking system in accordance with one example embodiment.

FIG. 3 illustrates the visual tracking system 108 in accordance with one example embodiment. The visual tracking system 108 includes an inertial sensor module 302, an optical sensor module 304, a blur reduction module 306, and a pose estimation module 308. The inertial sensor module 302 accesses inertial sensor data from the inertial sensor 210. The optical sensor module 304 accesses optical sensor data (e.g., image, camera settings/operating parameters) from the optical sensor 212. Examples of camera operating parameters include, but are not limited to, exposure time of the optical sensor 212, a field of view of the optical sensor 212, an ISO value of the optical sensor 212, and an image resolution of the optical sensor 212.

In one example embodiment, the blur reduction module 306 determines an angular velocity of the optical sensor 212 based on IMU sensor data from the inertial sensor 210. The blur reduction module 306 estimates a motion blur level based on the angular velocity and the camera operating parameters without performing any analysis of the pixels in the images.

In another example embodiment, the blur reduction module 306 considers both the angular and the linear velocity of the optical sensor 212 based on current velocity estimates from the visual tracking system 108, combined with the 3D locations of the currently tracked points in the current image.

For example, the blur reduction module 306 determines the linear velocity of the optical sensor 212 and the impact of the linear velocity on different areas of the current image based on the distance of objects (from the optical sensor 212) in the current image (e.g., as determined by the 3D locations of the feature points). As such, objects that are closer to the optical sensor 212 appears more blurry than objects that are further away from the optical sensor 212 (when the optical sensor 212 is moving).

The blur reduction module 306 adjusts the camera settings of the optical sensor 212 based on the estimated motion blur. In one example, the blur reduction module 306 adjusts the exposure time and ISO of the optical sensor 212 based on the estimated or predicted motion blur. In another example, the blur reduction module 306 determines a motion blur level without analyzing a content (e.g., pixels) of the images.

The pose estimation module 308 determines a pose (e.g., location, position, orientation) of the AR/VR display device 106 relative to a frame of reference (e.g., real-world environment 110). In one example embodiment, the pose estimation module 308 includes a VIO system that estimates the pose of the AR/VR display device 106 based on 3D maps of feature points from current images captured with the optical sensor 212 and the inertial sensor data captured with the inertial sensor 210.

In one example embodiment, the pose estimation module 308 computes the position and orientation of the AR/VR display device 106. The AR/VR display device 106 includes one or more optical sensor 212 mounted on a rigid platform (a frame of the AR/VR display device 106) with one or more inertial sensor 210. The optical sensor 212 can be mounted with non-overlapping (distributed aperture) or overlapping (stereo or more) fields-of-view.

In some example embodiments, the pose estimation module 308 includes an algorithm that combines inertial information from the inertial sensor 210 and image information from the pose estimation module 308 that are coupled to a rigid platform (e.g., AR/VR display device 106) or a rig. In one embodiment, a rig may consist of multiple cameras mounted on a rigid platform with an inertial navigation unit (e.g., inertial sensor 210). A rig may thus have at least one inertial navigation unit and at least one camera.

Figure 4:
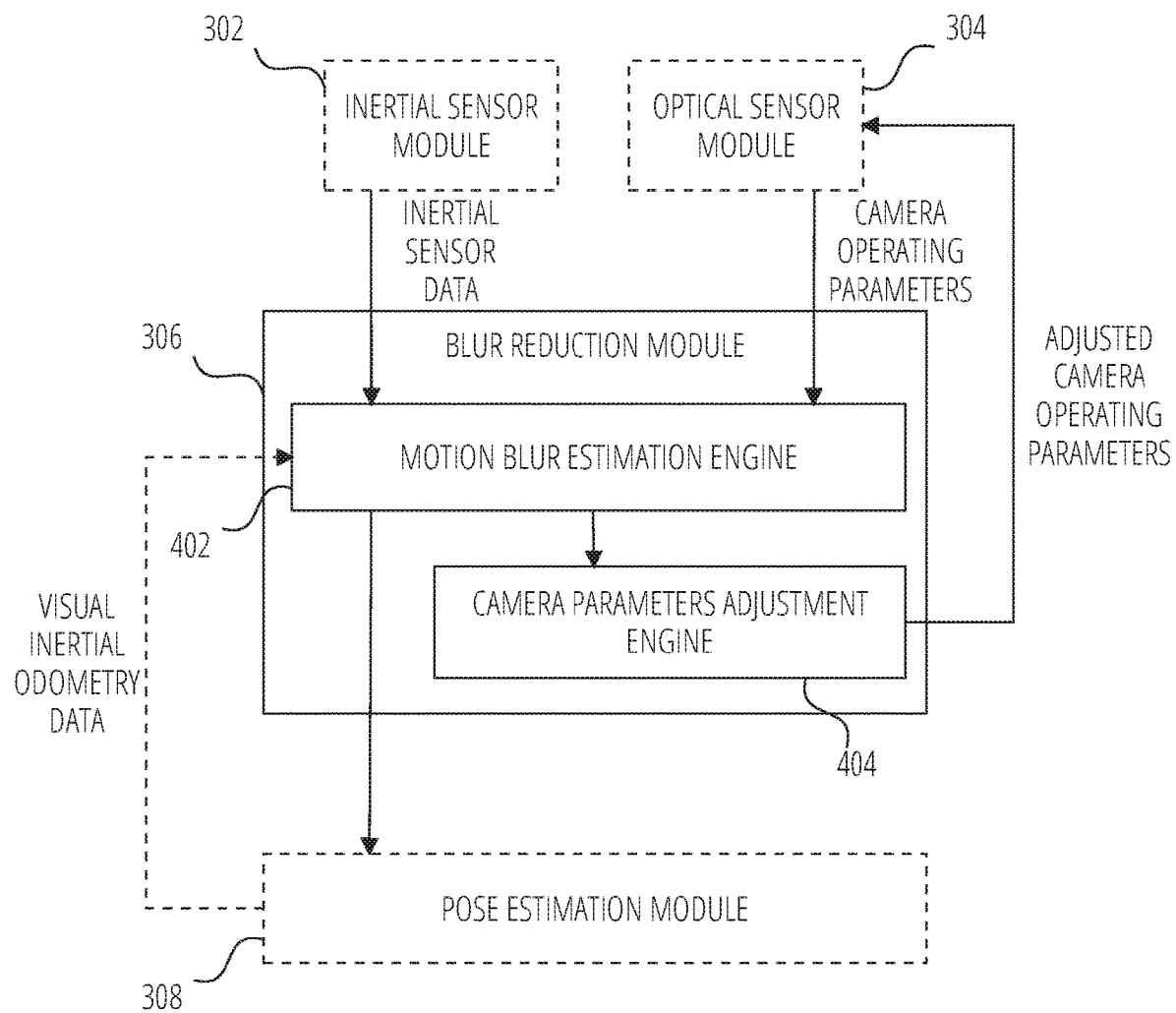
FIG. 4 is a block diagram illustrating a blur reduction module in accordance with one example embodiment.

FIG. 4 is a block diagram illustrating a blur reduction module 306 in accordance with one example embodiment. The blur reduction module 306 includes a motion blur estimation engine 402, and a camera parameters adjustment engine 404.

The motion blur estimation engine 402 retrieves camera operating parameters of the optical sensor 212 from the optical sensor module 304. For example, the camera operating parameters include settings of the optical sensor 212 during a capture/exposure time of a current image.

In one example embodiment, the motion blur estimation engine 402 determines an angular velocity of the optical sensor 212 based on IMU sensor data from the inertial sensor 210. The motion blur estimation engine 402 estimates a motion blur level based on the angular velocity and the camera operating parameters without performing any analysis of the pixels in the images.

In one example, the motion blur estimation engine 402 samples the angular velocity of the visual tracking system 108 based on the inertial sensor data during an exposure time of the current image. The motion blur estimation engine 402 determines the motion blur level in the current image based on the sampled angular velocity of the visual tracking system 108 and the camera operating parameters. In another example, the motion blur estimation engine 402 identifies a maximum angular velocity of the visual tracking system 108 based on the inertial sensor data during an exposure time of the current image. The motion blur estimation engine 402 estimates the motion blur level in the current image based on the maximum angular velocity of the visual tracking system 108 and the camera operating parameters.

In another example embodiment, the motion blur estimation engine 402 considers both the angular and the linear velocity of the optical sensor 212 based on current velocity estimates from the visual tracking system 108, combined with the 3D locations of the currently tracked points in the current image. For example, the motion blur estimation engine 402 determines the linear velocity of the optical sensor 212 and the impact of the linear velocity on different areas of the current image based on the distance of objects (from the optical sensor 212) in the current image (e.g., as determined by the 3D locations of the feature points). As such, objects that are closer to the optical sensor 212 appears more blurry than objects that are further away from the optical sensor 212 (when the optical sensor 212 is moving).

In another example embodiment, the motion blur estimation engine 402 determines whether the angular velocity/linear velocity exceeds a preset threshold. For example, the motion blur estimation engine 402 determines that the visual tracking system 108 is rotating fast because the angular velocity exceeds an angular velocity threshold. In that case, the motion blur estimation engine 402 notifies the camera parameters adjustment engine 404 of the fast rotation. Similarly, in another example, the motion blur estimation engine 402 determines that the visual tracking system 108 is moving fast because the linear velocity exceeds a linear velocity threshold. The motion blur estimation engine 402 notifies the camera parameters adjustment engine 404 of the fast rotation/motion.

The motion blur estimation engine 402 estimates a motion blur level based on the angular velocity of the optical sensor 212. For example, the motion blur level is 1 when the angular velocity is between a s−1 and b s−1, 2 when the angular velocity is between b s−1 and c s−1, and 3 when the angular velocity exceeds c s−1.

Similarly, the motion blur estimation engine 402 estimates a motion blur level based on the linear velocity of the optical sensor 212. For example, the motion blur level is 1 when the linear velocity is between a m/s and b m/s, 2 when the linear velocity is between b m/s and c m/s, and 3 when the linear velocity exceeds c m/s.

In another example, the motion blur estimation engine 402 determines whether the motion blur level for the current image exceeds a preset motion blur level. For example, the motion blur estimation engine 402 determines that the visual tracking system 108 is rotating fast because the motion blur level is 3 or above. In such case, the motion blur estimation engine 402 notifies the camera parameters adjustment engine 404 of the high motion blur level.

The camera parameters adjustment engine 404 adjusts an exposure time and the ISO value of the camera based on the angular/linear velocity relative to preset thresholds, or based on the estimated motion blur levels. For example, the camera parameters adjustment engine 404 decreases the exposure time and increases the ISO value of the optical sensor 212 when the blur reduction module 306 estimates a motion blur level 3 or above. In another example, camera parameters adjustment engine 404 adjusts a magnitude of changes in the exposure time and a magnitude of changes in the ISO value based on the motion blur level. As such, higher motion blur levels result in higher magnitude of decreased exposure time and higher magnitude of increased ISO value with higher motion blur levels.

Similarly, the camera parameters adjustment engine 404 increases the exposure time and decreases the ISO value of the optical sensor 212 when the blur reduction module 306 estimates a motion blur level 2 or below. In another example embodiment, the camera parameters adjustment engine 404 may adjust the change in magnitude value of the exposure time independently of the change in magnitude value of the value. For example, the camera parameters adjustment engine 404 decreases the exposure time by a higher magnitude relative to the increase in ISO value.

In one example embodiment, the camera parameters adjustment engine 404 detects that the increased ISO value exceeds a predefined maximum ISO value. In response, the camera parameters adjustment engine 404 adjusts the increased ISO value to the predefined maximum ISO value.

In another example embodiment, the camera parameters adjustment engine 404 detects that the motion blur level of the current image is within a motion blur threshold. In response, the camera parameters adjustment engine 404 increases the exposure time of the optical sensor 212 and decreases the ISO value of the optical sensor 212.

The camera parameters adjustment engine 404 communicates the adjusted camera operating parameters to the optical sensor module 304. For example, the camera parameters adjustment engine 404 changes the exposure time and the ISO value of the optical sensor module 304. In other example embodiment, the camera parameters adjustment engine 404 adjusts other settings (e.g., resolution, field of view) of the optical sensor 212.

Figure 5:
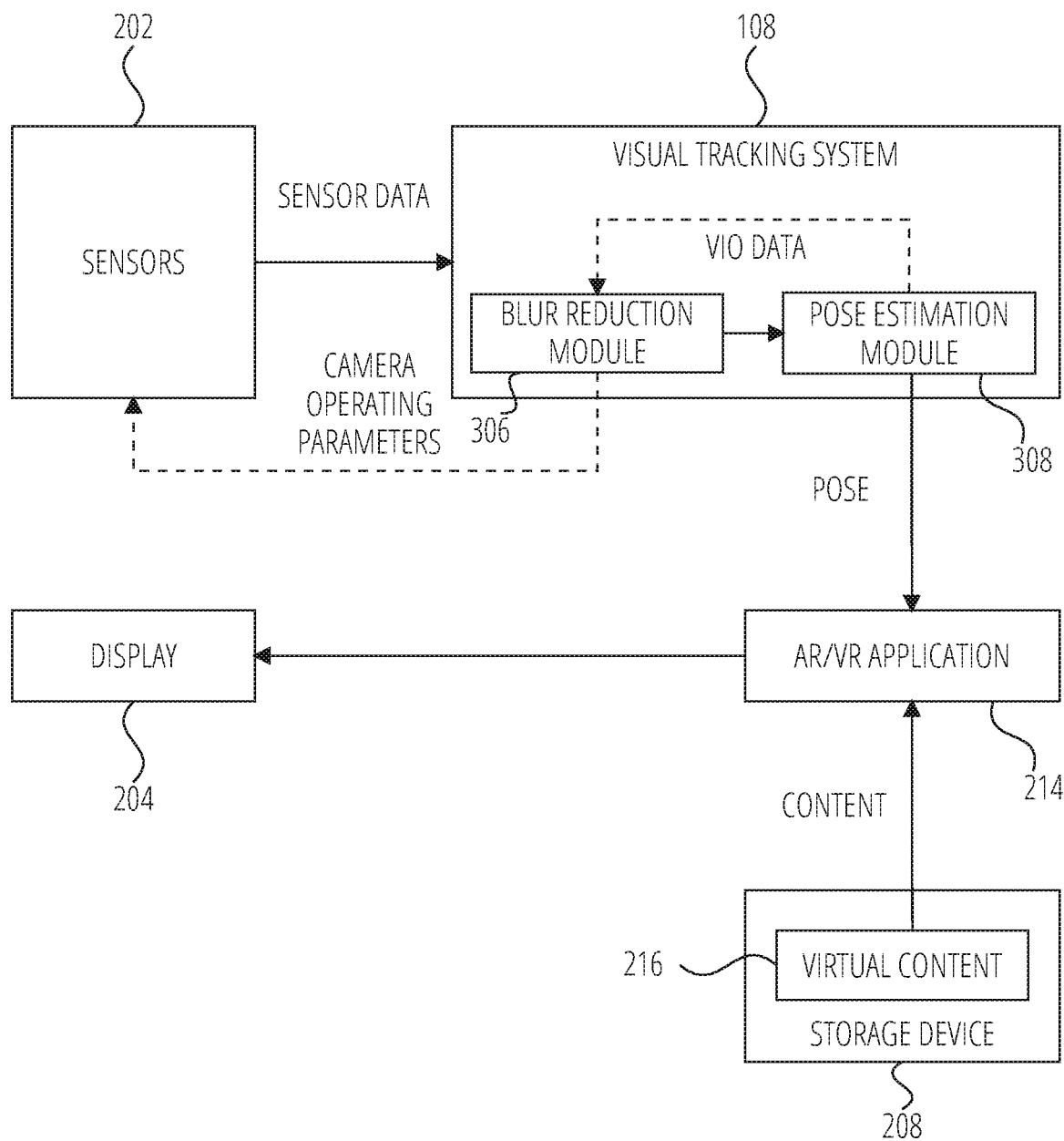
FIG. 5 is a block diagram illustrating a process for limiting motion blur in accordance with one example embodiment.

FIG. 5 is a block diagram illustrating an example process in accordance with one example embodiment. The visual tracking system 108 receives sensor data from sensors 202 to determine a pose of the AR/VR display device 106. The blur reduction module 306 estimates a blur motion level based on the sensor data (e.g., angular velocity from IMU, linear velocity from pose estimation module 308). The blur reduction module 306 adjusts camera operating parameters (e.g., exposure time, ISO value) of the optical sensor 212 based on the estimated blur motion level. The pose estimation module 308 identifies a pose of the visual tracking system 108 and provides the pose data to the AR/VR application 214.

The AR/VR application 214 retrieves virtual content 216 from the storage device 208 and causes the virtual content 216 to be displayed at a location (in the display 204) based on the pose of the AR/VR. display device 106.

Figure 6:
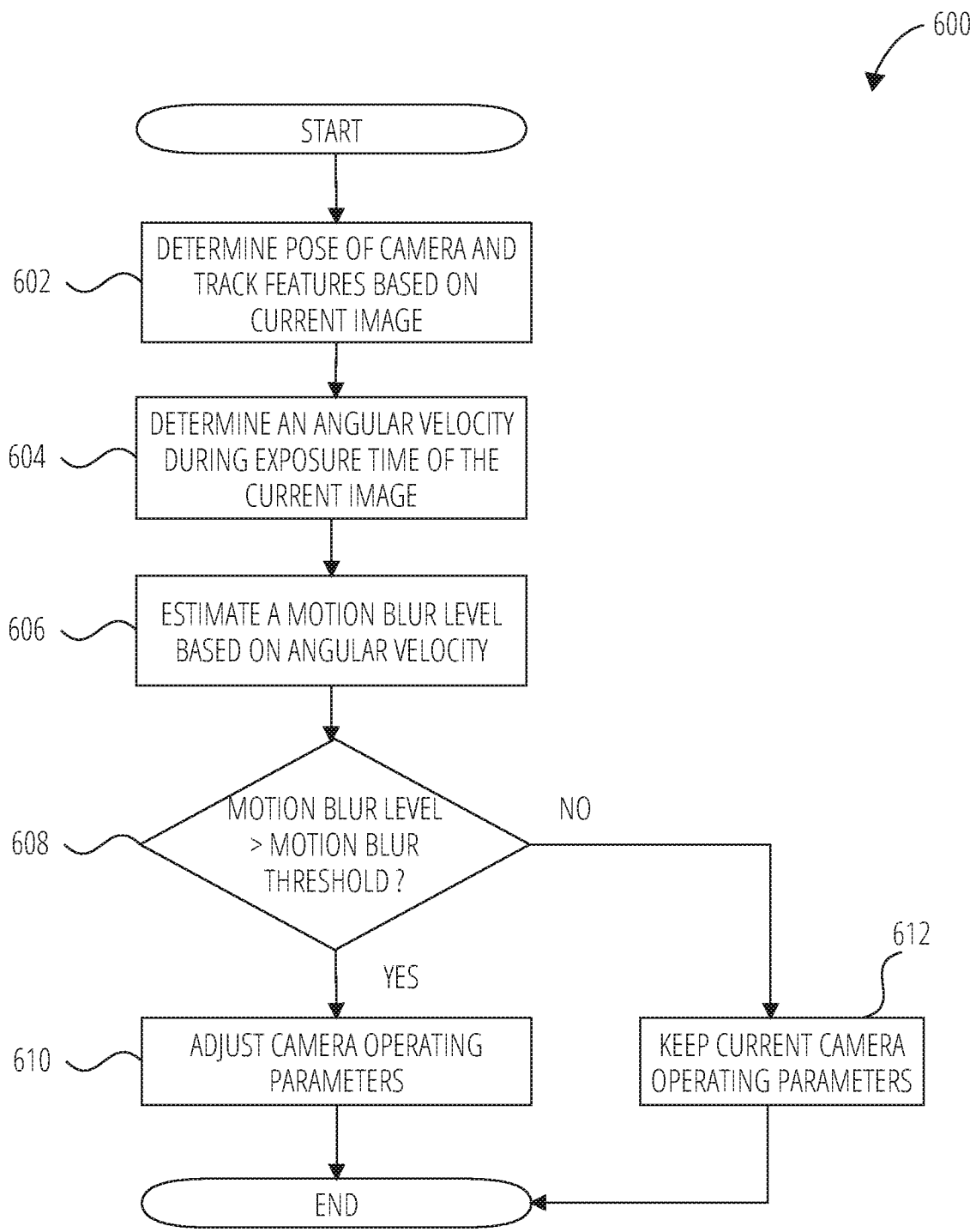
FIG. 6 is a flow diagram illustrating a method for limiting motion blur in accordance with one example embodiment.

FIG. 6 is a flow diagram illustrating a method 600 for limiting motion blur in accordance with one example embodiment. Operations in the method 600 may be performed by the visual tracking system 108, using components (e.g., modules, engines) described above with respect to FIG. 4. Accordingly, the method 600 is described by way of example with reference to the blur reduction module 306. However, it shall be appreciated that at least some of the operations of the method 600 may be deployed on various other hardware configurations or be performed by similar components residing elsewhere.

In block 602, the pose estimation module 308 determines a pose of the visual tracking system 108 and track features based on current image (from the optical sensor 212). In block 604, the motion blur estimation engine 402 determines an angular velocity during exposure time of the current image. In block 606, the motion blur estimation engine 402 estimates a motion blur level based on angular velocity. In decision block 608, the motion blur estimation engine 402 determines whether the motion blur level exceeds a preset motion blur threshold. In block 610, the camera parameters adjustment engine 404 adjusts camera operating parameters of the optical sensor 212. In block 612, the camera parameters adjustment engine 404 keeps the current camera operating parameters.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
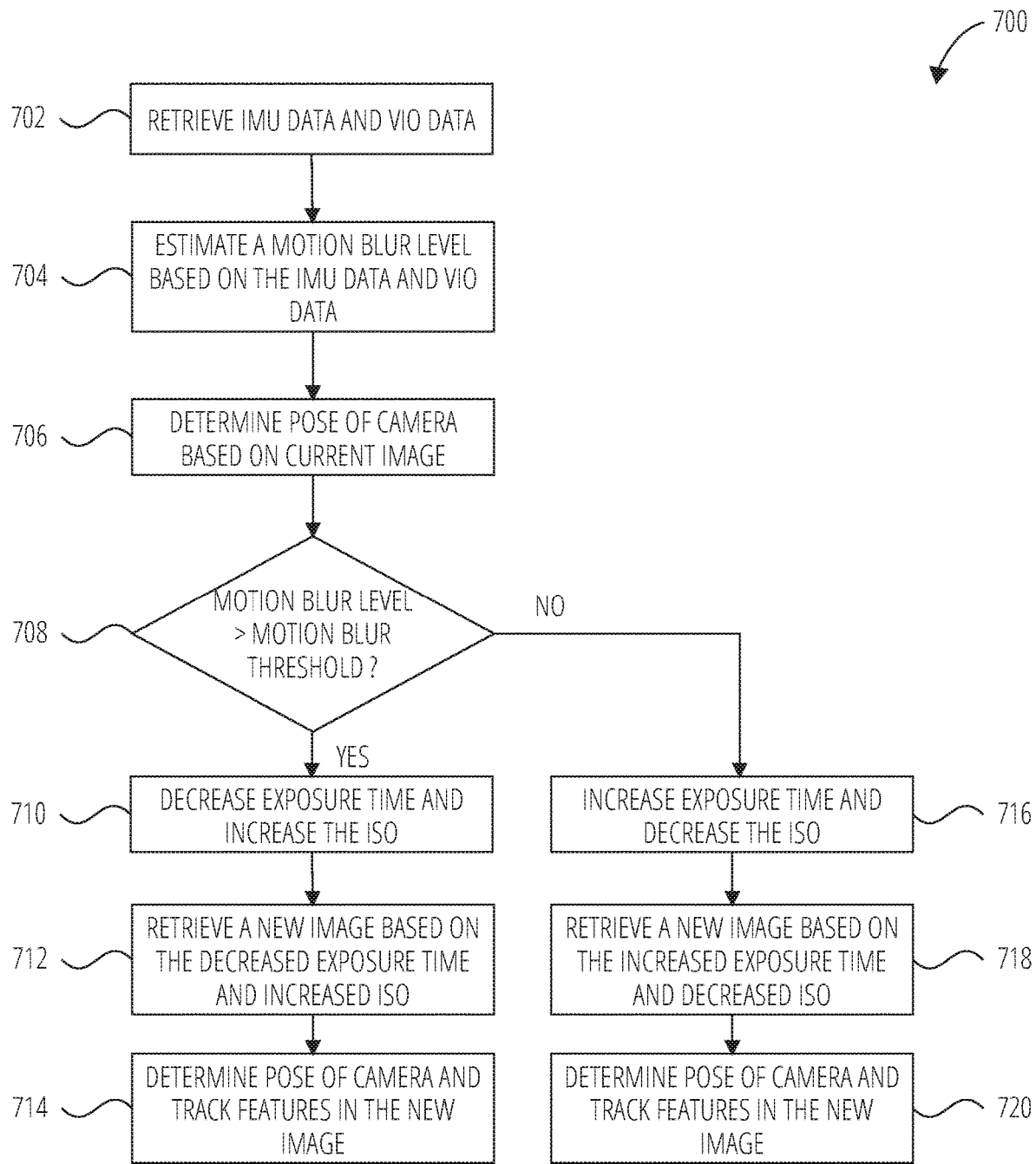
FIG. 7 is a flow diagram illustrating a method for limiting motion blur in accordance with another example embodiment.

FIG. 7 is a flow diagram illustrating a method 700 for limiting motion blur in accordance with another example embodiment. Operations in the method 700 may be performed by the blur reduction module 306, using components (e.g., modules, engines) described above with respect to FIG. 4. Accordingly, the method 700 is described by way of example with reference to the blur reduction module 306. However, it shall be appreciated that at least some of the operations of the method 700 may be deployed on various other hardware configurations or be performed by similar components residing elsewhere.

In block 702, the motion blur estimation engine 402 retrieve IMU data and VIO data. In block 704, the motion blur estimation engine 402 estimates a motion blur level based on the IMU data and/or VIO data. In block 706, the pose estimation module 308 determines a pose of optical sensor 212 based on a current image (generated by the optical sensor 212). In decision block 708, the motion blur estimation engine 402 determines whether the motion blur level exceeds a motion blur threshold. In block 710, the camera parameters adjustment engine 404 decreases exposure time and increases the ISO value in response to determining that the motion blur level exceeds the motion blur threshold. In block 712, the pose estimation module 308 retrieves a new image based on the decreased exposure time and increased ISO value. In block 714, the pose estimation module 308 determines a pose of the optical sensor 212 and tracks features in the new image. In block 716, the camera parameters adjustment engine 404 increases exposure time and decreases the ISO value in response to determining that the motion blur level is below the motion blur threshold. In block 718, the pose estimation module 308 retrieves a new image based on the increased exposure time and decreased ISO value. In block 720, the pose estimation module 308 determines a pose of optical sensor 212 and tracks features in the new image.

Figure 8:
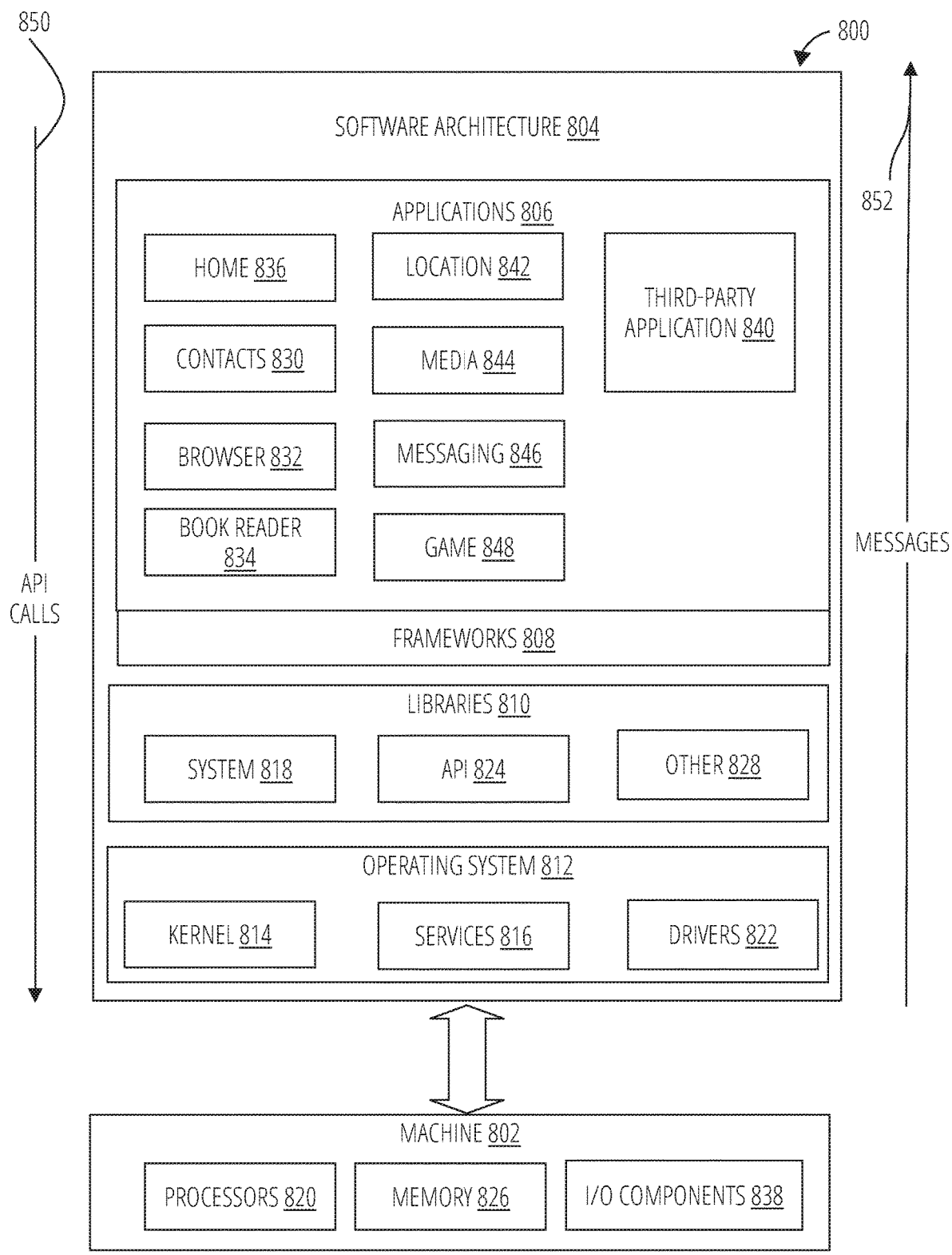
FIG. 8 is block diagram showing a software architecture within which the present disclosure may be implemented, according to an example embodiment.

FIG. 8 is a block diagram 800 illustrating a software architecture 804, which can be installed on any one or more of the devices described herein. The software architecture 804 is supported by hardware such as a machine 802 that includes Processors 820, memory 826, and 110 Components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, Processor management (e.g., scheduling), Component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Figure 9:
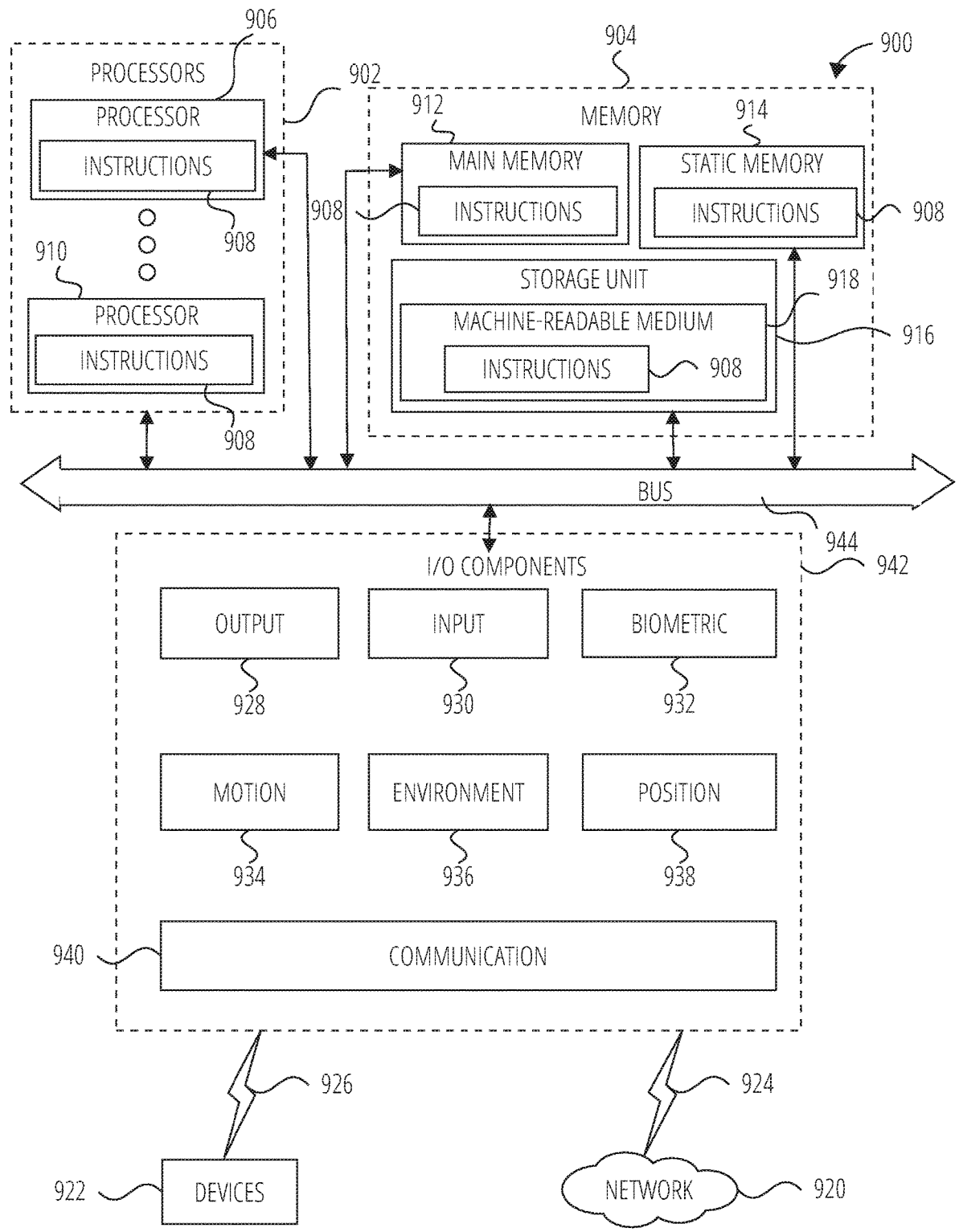
FIG. 9 is a diagrammatic representation of a machine in the form of a computer system within which a set of instructions may be executed for causing the machine to perform any one or more of the methodologies discussed herein, according to one example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include Processors 902, memory 904, and I/O Components 942, which may be configured to communicate with each other via a bus 944. In an example embodiment, the Processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 906 and a Processor 910 that execute the instructions 908. The term "Processor" is intended to include multi-core Processors that may comprise two or more independent Processors (sometimes referred to as "cores") that may execute instructions contemporaneously. Although FIG. 9 shows multiple Processors 902, the machine 900 may include a single Processor with a single core, a single Processor with multiple cores (e.g., a multi-core Processor), multiple Processors with a single core, multiple Processors with multiples cores, or any combination thereof.

The memory 904 includes a main memory 912, a static memory 914, and a storage unit 916, both accessible to the Processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the Processors 902 (e.g., within the Processor's cache memory), or any suitable combination thereof, during execution thereof by the machine 900.

The I/O Components 942 may include a wide variety of Components to receive input, provide output, produce output, transmit information, exchange information, capture measurements, and so on. The specific I/O Components 942 that are included in a particular machine will depend on the type of machine. For example, portable machines such as mobile phones may include a touch input device or other such input mechanisms, while a headless server machine will likely not include such a touch input device. It will be appreciated that the I/O Components 942 may include many other Components that are not shown in FIG. 9. In various example embodiments, the I/O Components 942 may include output Components 928 and input Components 930. The output Components 928 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 930 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 942 may include biometric Components 932, motion Components 934, environmental Components 936, or position Components 938, among a wide array of other Components. For example, the biometric Components 932 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 934 include acceleration sensor Components (e.g., accelerometer), gravitation sensor Components, rotation sensor Components (e.g., gyroscope), and so forth. The environmental Components 936 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 938 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 942 further include communication Components 940 operable to couple the machine 900 to a network 920 or devices 922 via a coupling 924 and a coupling 926, respectively. For example, the communication Components 940 may include a network interface Component or another suitable device to interface with the network 920. In further examples, the communication Components 940 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 922 may be another machine or any of a wide variety of peripheral devices (e.g., a peripheral device coupled via a USB).

Moreover, the communication Components 940 may detect identifiers or include Components operable to detect identifiers. For example, the communication Components 940 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the Processors 902) and/or storage unit 916 may store one or more sets of instructions and data structures (e.g., software) embodying or used by any one or more of the methodologies or functions described herein. These instructions (e.g., the instructions 908), when executed by Processors 902, cause various operations to implement the disclosed embodiments.

The instructions 908 may be transmitted or received over the network 920, using a transmission medium, via a network interface device (e.g., a network interface Component included in the communication Components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

System with Head-Wearable Apparatus

Figure 10:
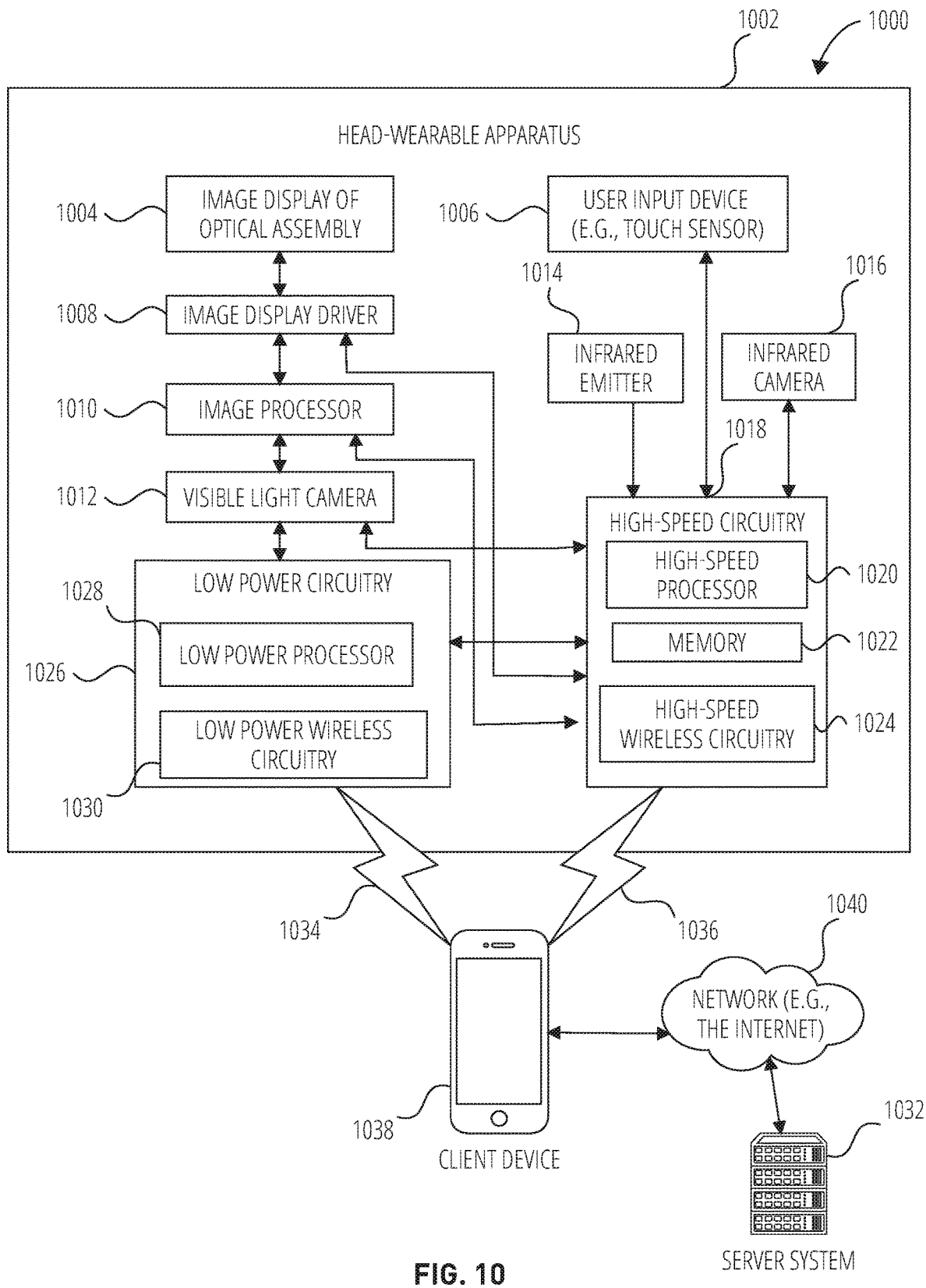
FIG. 10 illustrates a network environment in which a head-wearable device can be implemented according to one example embodiment.

FIG. 10 illustrates a network environment 1000 in which the head-wearable apparatus 1002 can be implemented according to one example embodiment. FIG. 10 is a high-level functional block diagram of an example head-wearable apparatus 1002 communicatively coupled a mobile client device 1038 and a server system 1032 via various network 1040.

The head-wearable apparatus 1002 includes a camera, such as at least one of visible light camera 1012, infrared emitter 1014 and infrared camera 1016. The client device 1038 can be capable of connecting with head-wearable apparatus 1002 using both a communication 1034 and a communication 1036, client device 1038 is connected to server system 1032 and network 1040. The network 1040 may include any combination of wired and wireless connections.

The head-wearable apparatus 1002 further includes two image displays of the image display of optical assembly 1004. The two include one associated with the left lateral side and one associated with the right lateral side of the head-wearable apparatus 1002. The head-wearable apparatus 1002 also includes image display driver 1008, image processor 1010, low-power low power circuitry 1026, and high-speed circuitry 1018. The image display of optical assembly 1004 are for presenting images and videos, including an image that can include a graphical user interface to a user of the head-wearable apparatus 1002.

The image display driver 1008 commands and controls the image display of the image display of optical assembly 1004. The image display driver 1008 may deliver image data directly to the image display of the image display of optical assembly 1004 for presentation or may have to convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1002 includes a frame and stems (or temples) extending from a lateral side of the frame. The head-wearable apparatus 1002 further includes a user input device 1006 (e.g., touch sensor or push button) including an input surface on the head-wearable apparatus 1002. The user input device 1006 (e.g., touch sensor or push button) is to receive from the user an input selection to manipulate the graphical user interface of the presented image.

The components shown in FIG. 10 for the head-wearable apparatus 1002 are located on one or more circuit boards, for example a PCB or flexible PCB, in the rims or temples. Alternatively, or additionally, the depicted components can be located in the chunks, frames, hinges, or bridge of the head-wearable apparatus 1002. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1002 includes a memory 1022 which stores instructions to perform a subset or all of the functions described herein. memory 1022 can also include storage device.

As shown in FIG. 10, high-speed circuitry 1018 includes high-speed processor 1020, memory 1022, and high-speed wireless circuitry 1024. In the example, the image display driver 1008 is coupled to the high-speed circuitry 1018 and operated by the high-speed processor 1020 in order to drive the left and right image displays of the image display of optical assembly 1004. high-speed processor 1020 may be any processor capable of managing high-speed communications and operation of any general computing system needed for head-wearable apparatus 1002. The high-speed processor 1020 includes processing resources needed for managing high-speed data transfers on communication 1036 to a wireless local area network (WLAN) using high-speed wireless circuitry 1024. In certain examples, the high-speed processor 1020 executes an operating system such as a LINUX operating system or other such operating system of the head-wearable apparatus 1002 and the operating system is stored in memory 1022 for execution. In addition to any other responsibilities, the high-speed processor 1020 executing a software architecture for the head-wearable apparatus 1002 is used to manage data transfers with high-speed wireless circuitry 1024. In certain examples, high-speed wireless circuitry 1024 is configured to implement Institute of Electrical and Electronic Engineers (IEEE) 802.11 communication standards, also referred to herein as Wi-Fi. In other examples, other high-speed communications standards may be implemented by high-speed wireless circuitry 1024.

The low power wireless circuitry 1030 and the high-speed wireless circuitry 1024 of the head-wearable apparatus 1002 can include short range transceivers (Bluetooth™) and wireless wide, local, or wide area network transceivers (e.g., cellular or WiFi). The client device 1038, including the transceivers communicating via the communication 1034 and communication 1036, may be implemented using details of the architecture of the head-wearable apparatus 1002, as can other elements of network 1040.

The memory 1022 includes any storage device capable of storing various data and applications, including, among other things, camera data generated by the left and right, infrared camera 1016, and the image processor 1010, as well as images generated for display by the image display driver 1008 on the image displays of the image display of optical assembly 1004. While memory 1022 is shown as integrated with high-speed circuitry 1018, in other examples, memory 1022 may be an independent standalone element of the head-wearable apparatus 1002. In certain such examples, electrical routing lines may provide a connection through a chip that includes the high-speed processor 1020 from the image processor 1010 or low power processor 1028 to the memory 1022. In other examples, the high-speed processor 1020 may manage addressing of memory 1022 such that the low power processor 1028 will boot the high-speed processor 1020 any time that a read or write operation involving memory 1022 is needed.

As shown in FIG. 10, the low power processor 1028 or high-speed processor 1020 of the head-wearable apparatus 1002 can be coupled to the camera (visible light camera 1012; infrared emitter 1014, or infrared camera 1016), the image display driver 1008, the user input device 1006 (e.g., touch sensor or push button), and the memory 1022.

The head-wearable apparatus 1002 is connected with a host computer. For example, the head-wearable apparatus 1002 is paired with the client device 1038 via the communication 1036 or connected to the server system 1032 via the network 1040. server system 1032 may be one or more computing devices as part of a service or network computing system, for example, that include a processor, a memory, and network communication interface to communicate over the network 1040 with the client device 1038 and head-wearable apparatus 1002.

The client device 1038 includes a processor and a network communication interface coupled to the processor. The network communication interface allows for communication over the network 1040, communication 1034 or communication 1036. client device 1038 can further store at least portions of the instructions for generating a binaural audio content in the client device 1038's memory to implement the functionality described herein.

Output components of the head-wearable apparatus 1002 include visual components, such as a display such as a liquid crystal display (LCD), a plasma display panel (PDP), a light emitting diode (LED) display, a projector, or a waveguide. The image displays of the optical assembly are driven by the image display driver 1008. The output components of the head-wearable apparatus 1002 further include acoustic components (e.g., speakers), haptic components (e.g., a vibratory motor), other signal generators, and so forth. The input components of the head-wearable apparatus 1002, the client device 1038, and server system 1032, such as the user input device 1006, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1002 may optionally include additional peripheral device elements. Such peripheral device elements may include biometric sensors, additional sensors, or display elements integrated with head-wearable apparatus 1002. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1036 from the client device 1038 via the low power wireless circuitry 1030 or high-speed wireless circuitry 1024.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for limiting motion blur in a visual tracking system comprising: accessing a first image generated by an optical sensor of the visual tracking system; identifying camera operating parameters of the optical sensor for the first image; determining a motion of the optical sensor for the first image; determining a motion blur level of the first image based on the camera operating parameters of the optical sensor and the motion of the optical sensor; and adjusting the camera operating parameters of the optical sensor based on the motion blur level.

Example 2 includes example 1, wherein determining the motion of the optical sensor comprises: retrieving inertial sensor data from an inertial sensor of the visual tracking system, the inertial sensor data corresponding to the first image; and determining an angular velocity of the visual tracking system based on the inertial sensor data, wherein the motion blur level is further based on the angular velocity of the visual tracking system without analyzing a content of the first image.

Example 3 includes example 1, wherein determining the motion of the optical sensor comprises: accessing VIO data from a VIO system of the visual tracking system, the VIO data comprising an estimated angular velocity of the optical sensor, an estimated linear velocity of the optical sensor, and locations of feature points in the first image, wherein the motion blur level is based on the camera operating parameters and the VIO data without analyzing a content of the first image, wherein the motion blur in different areas of the first image is based on the estimated angular velocity, the estimated linear velocity of the optical sensor, and the locations of the 3D feature points in corresponding different areas of the first image with respect to the optical sensor.

Example 4 includes example 2, further comprising: sampling the angular velocity of the visual tracking system based on the inertial sensor data during an exposure time of the first image, wherein the motion blur level in the first image is determined based on the sampled angular velocity of the visual tracking system and the camera operating parameters.

Example 5 includes example 2, further comprising: identifying a maximum angular velocity of the visual tracking system based on the inertial sensor data during an exposure time of the first image, wherein the motion blur level in the first image is determined based on the maximum angular velocity of the visual tracking system and the camera operating parameters.

Example 6 includes example 1, wherein the camera operating parameters comprise a combination of an exposure time of the optical sensor, a field of view of the optical sensor, an ISO value of the optical sensor, and an image resolution.

Example 7 includes example 6, further comprising: detecting that the motion blur level of the first image exceeds a motion blur threshold; and in response to detecting that the motion blur level of the first image exceeds the motion blur threshold, decreasing the exposure time of the optical sensor and increasing the ISO value of the optical sensor.

Example 8 includes example 7, further comprising: detecting that the increased ISO value exceeds a predefined maximum ISO value; and in response to detecting that the increased ISO value exceeds the predefined maximum ISO value, adjusting the increased ISO value to the predefined maximum ISO value.

Example 9 includes example 6, further comprising: detecting that the motion blur level of the first image is within a motion blur threshold; and in response to detecting that the motion blur level of the first image is within the motion blur threshold, increasing the exposure time of the optical sensor and decreasing the ISO value of the optical sensor.

Example 10 includes example 1, further comprising: accessing a second image generated by the optical sensor that is operating with the adjusted camera operating parameters; and identifying a feature in the second image.

Example 11 is a computing apparatus comprising: a processor; and a memory storing instructions that, when executed by the processor, configure the apparatus to perform operations comprising: access a first image generated by an optical sensor of a visual tracking system; identify camera operating parameters of the optical sensor for the first image; determine a motion of the optical sensor for the first image; determine a motion blur level of the first image based on the camera operating parameters of the optical sensor and the motion of the optical sensor; and adjust the camera operating parameters of the optical sensor based on the motion blur level.

Example 12 includes example 11, wherein determining the motion of the optical sensor comprises: retrieve inertial sensor data from an inertial sensor of the visual tracking system, the inertial sensor data corresponding to the first image; and determine an angular velocity of the visual tracking system based on the inertial sensor data, wherein the motion blur level is further based on the angular velocity of the visual tracking system without analyzing a content of the first image.

Example 13 includes example 11, wherein determining the motion of the optical sensor comprises: accessing VIO data from a VIO system of the visual tracking system, the VIO data comprising an estimated angular velocity of the optical sensor, an estimated linear velocity of the optical sensor, and locations of feature points in the first image, wherein the motion blur level is based on the camera operating parameters and the VIO data without analyzing a content of the first image, wherein the motion blur in different areas of the first image is based on the estimated angular velocity, the estimated linear velocity of the optical sensor, and the locations of the 3D feature points in corresponding different areas of the first image with respect to the optical sensor.

Example 14 includes example 12, wherein the instructions further configure the apparatus to: sample the angular velocity of the visual tracking system based on the inertial sensor data during an exposure time of the first image, wherein the motion blur level in the first image is determined based on the sampled angular velocity of the visual tracking system and the camera operating parameters.

Example 15 includes example 12, wherein the instructions further configure the apparatus to: identify a maximum angular velocity of the visual tracking system based on the inertial sensor data during an exposure time of the first image, wherein the motion blur level in the first image is determined based on the maximum angular velocity of the visual tracking system and the camera operating parameters.

Example 16 includes example 11, wherein the camera operating parameters comprise a combination of an exposure time of the optical sensor, a field of view of the optical sensor, an ISO value of the optical sensor, and an image resolution.

Example 17 includes example 16, wherein the instructions further configure the apparatus to: detect that the motion blur level of the first image exceeds a motion blur threshold; and in response to detecting that the motion blur level of the first image exceeds the motion blur threshold, decrease the exposure time of the optical sensor and increasing the ISO value of the optical sensor.

Example 18 includes example 17, wherein the instructions further configure the apparatus to: detect that the increased ISO value exceeds a predefined maximum ISO value; and in response to detecting that the increased ISO value exceeds the predefined maximum ISO value, adjust the increased ISO value to the predefined maximum ISO value.

Example 19 includes example 16, wherein the instructions further configure the apparatus to: detect that the motion blur level of the first image is within a motion blur threshold; and in response to detecting that the motion blur level of the first image is within the motion blur threshold, increase the exposure time of the optical sensor and decreasing the ISO value of the optical sensor.

Example 20 is a non-transitory computer-readable storage medium, the computer-readable storage medium including instructions that when executed by a computer, cause the computer to perform operations comprising: access a first image generated by an optical sensor of a visual tracking system; identify camera operating parameters of the optical sensor for the first image; determine a motion of the optical sensor for the first image; determine a motion blur level of the first image based on the camera operating parameters of the optical sensor and the motion of the optical sensor; and adjust the camera operating parameters of the optical sensor based on the motion blur level.

What is claimed is:

1. A method for limiting motion blur in a visual tracking system comprising:
   accessing a first image generated by an optical sensor of the visual tracking system;
   identifying camera operating parameters of the optical sensor for the first image;
   determining a motion of the optical sensor for the first image by accessing VIO data from a VIO system of the visual tracking system;
   determining a motion blur level of the first image based on the camera operating parameters of the optical sensor and the VIO data without analyzing a content of the first image; and
   adjusting the camera operating parameters of the optical sensor based on the motion blur level.

2. The method of claim 1, wherein determining the motion of the optical sensor comprises:
   retrieving inertial sensor data from an inertial sensor of the visual tracking system, the inertial sensor data corresponding to the first image; and
   determining an angular velocity of the visual tracking system based on the inertial sensor data,
   wherein the motion blur level is further based on the angular velocity of the visual tracking system without analyzing a content of the first image.

3. The method of claim 1, wherein
   the VIO data comprise an estimated angular velocity of the optical sensor, an estimated linear velocity of the optical sensor, and locations of feature points in the first image,
   wherein the motion blur in different areas of the first image is based on the estimated angular velocity, the estimated linear velocity of the optical sensor, and the locations of the 3D feature points in corresponding different areas of the first image with respect to the optical sensor.

4. The method of claim 2, further comprising:
   sampling the angular velocity of the visual tracking system based on the inertial sensor data during an exposure time of the first image,
   wherein the motion blur level in the first image is determined based on the sampled angular velocity of the visual tracking system and the camera operating parameters.

5. The method of claim 2, further comprising:
   identifying a maximum angular velocity of the visual tracking system based on the inertial sensor data during an exposure time of the first image,
   wherein the motion blur level in the first image is determined based on the maximum angular velocity of the visual tracking system and the camera operating parameters.

6. The method of claim 1, wherein the camera operating parameters comprise a combination of an exposure time of the optical sensor, a field of view of the optical sensor, an ISO value of the optical sensor, and an image resolution.

7. The method of claim 6, further comprising:
   detecting that the motion blur level of the first image exceeds a motion blur threshold; and
   in response to detecting that the motion blur level of the first image exceeds the motion blur threshold, decreasing the exposure time of the optical sensor and increasing the ISO value of the optical sensor.

8. The method of claim 7, further comprising:
   detecting that the increased ISO value exceeds a predefined maximum ISO value; and
   in response to detecting that the increased ISO value exceeds the predefined maximum ISO value, adjusting the increased ISO value to the predefined maximum ISO value.

9. The method of claim 6, further comprising:
   detecting that the motion blur level of the first image is within a motion blur threshold; and
   in response to detecting that the motion blur level of the first image is within the motion blur threshold, increasing the exposure time of the optical sensor and decreasing the ISO value of the optical sensor.

10. The method of claim 1, further comprising:
    accessing a second image generated by the optical sensor that is operating with the adjusted camera operating parameters; and
    identifying a feature in the second image.

11. A computing apparatus comprising:
    a processor; and
    a memory storing instructions that, when executed by the processor, configure the apparatus to perform operations comprising:
    access a first image generated by an optical sensor of a visual tracking system;
    identify camera operating parameters of the optical sensor for the first image;

determine a motion of the optical sensor for the first image by accessing VIO data from a VIO system of the visual tracking system;

determine a motion blur level of the first image based on the camera operating parameters of the optical sensor and the VIO data without analyzing a content of the first image; and adjust the camera operating parameters of the optical sensor based on the motion blur level.

12. The computing apparatus of claim 11, wherein determining the motion of the optical sensor comprises:

retrieve inertial sensor data from an inertial sensor of the visual tracking system, the inertial sensor data corresponding to the first image; and determine an angular velocity of the visual tracking system based on the inertial sensor data, wherein the motion blur level is further based on the angular velocity of the visual tracking system without analyzing a content of the first image.

13. The computing apparatus of claim 11, wherein the VIO data comprise an estimated angular velocity of the optical sensor, an estimated linear velocity of the optical sensor, and locations of feature points in the first image, wherein the motion blur in different areas of the first image is based on the estimated angular velocity, the estimated linear velocity of the optical sensor, and the locations of the 3D feature points in corresponding different areas of the first image with respect to the optical sensor.

14. The computing apparatus of claim 12, wherein the instructions further configure the apparatus to:

sample the angular velocity of the visual tracking system based on the inertial sensor data during an exposure time of the first image, wherein the motion blur level in the first image is determined based on the sampled angular velocity of the visual tracking system and the camera operating parameters.

15. The computing apparatus of claim 12, wherein the instructions further configure the apparatus to:

identify a maximum angular velocity of the visual tracking system based on the inertial sensor data during an exposure time of the first image, wherein the motion blur level in the first image is determined based on the maximum angular velocity of the visual tracking system and the camera operating parameters.

16. The computing apparatus of claim 11, wherein the camera operating parameters comprise a combination of an exposure time of the optical sensor, a field of view of the optical sensor, an ISO value of the optical sensor, and an image resolution.

17. The computing apparatus of claim 16, wherein the instructions further configure the apparatus to:

detect that the motion blur level of the first image exceeds a motion blur threshold; and in response to detecting that the motion blur level of the first image exceeds the motion blur threshold, decrease the exposure time of the optical sensor and increasing the ISO value of the optical sensor.

18. The computing apparatus of claim 17, wherein the instructions further configure the apparatus to:

detect that the increased ISO value exceeds a predefined maximum ISO value; and in response to detecting that the increased ISO value exceeds the predefined maximum ISO value, adjust the increased ISO value to the predefined maximum ISO value.

19. The computing apparatus of claim 16, wherein the instructions further configure the apparatus to:

detect that the motion blur level of the first image is within a motion blur threshold; and in response to detecting that the motion blur level of the first image is within the motion blur threshold, increase the exposure time of the optical sensor and decreasing the ISO value of the optical sensor.

20. A non-transitory computer-readable storage medium, the computer-readable storage medium including instructions that when executed by a computer, cause the computer to perform operations comprising:

access a first image generated by an optical sensor of a visual tracking system;

identify camera operating parameters of the optical sensor for the first image;

determine a motion of the optical sensor for the first image by accessing VIO data from a VIO system of the visual tracking system;

determine a motion blur level of the first image based on the camera operating parameters of the optical sensor and the VIO data without analyzing a content of the first image; and adjust the camera operating parameters of the optical sensor based on the motion blur level.

* * * * *